(12) United States Patent
Lynch et al.

(10) Patent No.: US 8,131,420 B2
(45) Date of Patent: Mar. 6, 2012

(54) VEHICLE HEALTH AND USAGE MONITORING SYSTEM AND METHOD

(75) Inventors: Michael Anthony Lynch, Arlington, VT (US); Robert Zeliff, Bridport, VT (US); Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 1070 days.

(21) Appl. No.: 12/038,463

(22) Filed: Feb. 27, 2008

(65) Prior Publication Data
US 2009/0216398 A1    Aug. 27, 2009

(51) Int. Cl.
*G01M 17/00*    (2006.01)

(52) U.S. Cl. ............... 701/30; 701/29; 701/34; 701/36; 340/425.5; 340/438; 340/439

(58) Field of Classification Search .............. 701/29, 701/30, 33, 34, 36; 340/425.5, 438, 439; 73/865.9
See application file for complete search history.

(56) References Cited

U.S. PATENT DOCUMENTS

| | | | |
|---|---|---|---|
| 4,072,926 A | 2/1978 | Shimahara et al. | |
| 4,858,469 A | 8/1989 | Hosgood et al. | |
| 6,192,759 B1 | 2/2001 | Schoess | |
| 6,688,168 B1 | 2/2004 | Elliott et al. | |
| 6,731,205 B2 | 5/2004 | Schofield et al. | |
| 2004/0078662 A1 | 4/2004 | Hamel et al. | |
| 2004/0089082 A1 | 5/2004 | Gifford et al. | |
| 2006/0243180 A1 | 11/2006 | Sundermeyer et al. | |
| 2007/0095160 A1 | 5/2007 | Georgeson et al. | |
| 2007/0241740 A1 | 10/2007 | Hawes | |
| 2008/0036617 A1* | 2/2008 | Arms et al. .................. 340/679 |
| 2008/0117036 A1 | 5/2008 | Kenny et al. | |

FOREIGN PATENT DOCUMENTS

| | | |
|---|---|---|
| EP | 0 407 179 | 1/1991 |
| EP | 1 246 094 | 10/2002 |

OTHER PUBLICATIONS

Search Report for corresponding British Application No. GB0902379.7 dated Jun. 11, 2009.
AAR400, *HUMS R&D Projects/Tasks* (visited Nov. 2, 2007) http://aar400.tc.faa.gov/Programs/AgingAircraft/rotorcraft/HUMS.htm.
AAR400, *Health and Usage Monitoring Systems (HUMS) R&D* (visited Nov. 2, 2007) http://aar400.tc.faa.gov/Programs/AgingAircraft/rotorcraft/HUMS.htm.

(Continued)

*Primary Examiner* — Gertrude Arthur Jeanglaude
(74) *Attorney, Agent, or Firm* — Smith Moore Leatherwood LLP (57) ABSTRACT

A health and usage monitoring system (HUMS) and method for monitoring the health and/or usage of one or more components of a vehicle. In various embodiments, the present invention uses a plurality of wireless sensors configured, when activated by a vibration of the vehicle, to monitor one or more components of the vehicle and to communicate health and/or usage data of the one or more components of the vehicle to a data access point. The data access point may relay real-time health and/or usage data to an operator of the vehicle, or the health and/or usage data may accessed later. Such a system allows critical components of the vehicle to be monitored so as to reduce failures, and so that repairs to, or replacements of, the critical components of the vehicle may be planned, thus reducing unscheduled downtime.

30 Claims, 4 Drawing Sheets

OTHER PUBLICATIONS

OuterLink, Goodrich and Draper Laboratory Enable Wireless HUMS for Navy Aircraft—Satellite-based Aircraft Connectivity Delivers Health and Usage Monitoring System (HUMS) Data for Enhanced Flight Safety (visited Nov. 13, 2007) http://www.acq.osd.mil/jctd/articles/HUMS.htm.

Freshwater Technology, PMG Perpetuum, *Aerospace industry is quict to see potential of wireless sensing using vibration energy havesting microgenerators* (visited Nov. 13, 2007) http://www.freshwatertechnology.com/pr_perpetuum/per017.php.

Flight Data Services, *Helicopter Monitoring* (visited Nov. 2, 2007 and Feb. 27, 2008) http://www.flightdataservices.com/helicoptermonitoring.html.

David Jenson, Aviation Maintenance, *HUMS*, Oct. 1, 2006 (visited Nov. 2, 2007 and Feb. 27, 2008) http://www.aviationtoday.com/print/am/categories/military/5250.html.

Aviation Maintenance, *HUMS: Health and Usage Monitoring Systems*, Feb. 1, 2006 (visited Nov. 2, 2007 and Feb. 27, 2008) http://www.aviationtoday.com/print/am/categories/bga/76.html.

Ing. Carmine Salzano, Ph.D. and Craig Askzler, *Accelerometers for Health & Usage Monitoring Systems (HUMS)* http://www.dsto.defence.gov.au/attachments/Hums%20accelerometers.pdf.

Pakzad, et al., *Multi-Purpose Wireless Accelerometers for Civil Infrastructure Monitoring*, http://www.eecs.berkeley.edu/~binetude/work/IWSHM.pdf.

Office Action mailed Feb. 1, 2011 in connection with U.S. Appl. No. 12/038,419, filed Feb. 27, 2008.

Office Action mailed Jun. 10, 2011 in related U.S. Appl. No. 12/038,419.

* cited by examiner

VEHICLE HEALTH AND USAGE MONITORING SYSTEM AND METHOD

FIELD OF THE INVENTION

The present invention is directed to Health and Usage Monitoring Systems used to monitor the health and usage of engine and/or drive components of various vehicles.

BACKGROUND OF THE INVENTION

The in-flight failure of any engine and/or drive component of an aircraft can be catastrophic. For example, the failure of a drive component of a helicopter can lead to almost certain loss of life. While it is true that a failure of an engine component of one engine in a multi-engine airplane may not lead to loss of life, such a failure may be tremendously costly, resulting in unscheduled and expensive maintenance of the aircraft.

In response to concerns relating to such failures, certain governing bodies charged with regulating and overseeing aviation have begun to require the use of Health and Usage Monitoring Systems (HUMS) for various aircraft. In the past, any monitoring of critical components of an aircraft was performed by manual inspection before and after flights. Unfortunately, these manual inspection techniques were, at best, insufficient and were generally only successful in confirming the failure of a critical component.

HUMS represent technologically advanced monitoring systems that can forewarn of the upcoming failure of a component of the engine and/or drive system of an aircraft. Typical HUMS generally comprise a series of sensors and one or more data acquisition systems. The sensors are placed on critical components of the engine and drive systems, and the data acquisition system gathers data relating to the performance of the monitored components. For example, a helicopter HUMS may comprise a series of accelerometers that are placed on various components of the engine and drive system, such as components of the tail gear box, intermediate gear box, tail drive shaft, and main gear box. A data acquisition system gathers vibration data from each of the sensors, which data may then be analyzed after flight. Based on the known frequency responses of the monitored components, aberrations that are indicative of impending component failures may be noted during analysis. As a result, suspect components can be scheduled for maintenance prior to their failure.

The use of HUMS has dramatically improved the overall safety records of aircraft employing its technology. Reports indicate that HUMS use in aircraft has resulted in high success rates in detecting defects, as well as reductions in check flights, tests, and unscheduled maintenance. Thus, the use of HUMS allows an equipped aircraft to maintain a higher level of safety while increasing its operational readiness. Although beneficial, HUMS generally introduce weight tradeoffs, which ultimately translate into increased costs. In some rotary aircraft cases, every pound of extra weight in a helicopter can translate into a thousand of dollars in recurring costs and tens of thousands of dollars in non-recurring costs. Furthermore, the complexity of the aircraft can increase these costs. A typical helicopter HUMS may include more than thirty sensors, each hardwired to the data acquisition system. Additionally, each bulkhead of an aircraft will require through-bulkhead connectors for the sensor wires. Not only do the connectors add cost and weight to the aircraft, but they require increased installation time.

One way to decrease costs for the implementation of aircraft HUMS may be the use of a wireless interface to the monitoring sensors. However, wireless sensor systems may present an additional set of difficulties. For example, wireless sensor functionality may be limited by power. A larger power demand translates into the need for a larger power source, which increases the overall weight of the aircraft and boosts costs as described above. Thus, there remains a need for an improved Health and Usage Monitoring System for use in monitoring the health and usage of various components of a vehicle. The improved HUMS should provide accurate monitoring of key components of the vehicle while providing efficient weight and energy management performance characteristics.

BRIEF SUMMARY OF THE INVENTION

The present invention addresses the above needs and achieves other advantages by providing a health and usage monitoring system for use in monitoring health and usage of one or more components of a vehicle. In various embodiments, the present invention uses a plurality of wireless sensors configured, when activated by a vibration of the vehicle, to monitor one or more components of a vehicle and to communicate health and/or usage data of the one or more components of the vehicle to a data access point. The data access point may relay real-time health and/or usage data, or the health and/or usage data may accessed later. Such a system allows critical components of the vehicle to be monitored so as to reduce catastrophic failures and so that repairs to, or replacements of, the critical components of the vehicle may be planned, thus reducing unscheduled downtime.

In one embodiment, the present invention provides a health and usage monitoring system for use in monitoring health and usage of one or more components of a vehicle, the system comprising a data access point, a plurality of wireless sensors configured to monitor one or more components of the vehicle and to communicate monitoring data to the data access point, and at least one processing element in communication with and configured to control the plurality of wireless sensors, wherein one or more of the plurality of wireless sensors is configured to switch from a low power sleep mode to a data acquisition mode triggered at least in part by a vibration of the vehicle. In some embodiments, the one or more of the plurality of sensors communicates monitoring data to the data access point when the one or more of the plurality of sensors is in the data acquisition mode. In some embodiments, the one or more of the plurality of sensors is configured to switch from a low power deep sleep mode to a data acquisition mode.

In some embodiments, the processing element includes a vibration-based wakeup circuit, and the one or more of the plurality of sensors is configured to switch modes via the processing element. In some embodiments, the processing element includes a CMOS device, and the one or more of the plurality of sensors is configured to switch modes via the processing element. In some embodiments, the processing element includes an energy harvesting device and the one or more of the plurality of sensors is configured to switch modes via the processing element when the energy harvesting device sends an electrical charge triggered by a vibration of the vehicle. In some embodiments, the energy harvesting device may be selected from the group consisting of: an inductive energy harvesting device; a piezoelectric energy harvesting device; and combinations thereof. In some embodiments, the plurality of wireless sensors is configured to gather vibration data of one or more components of the vehicle. In some embodiments, the plurality of wireless sensors comprises wireless accelerometers.

In some embodiments, the health and usage monitoring system is configured to monitor one or more components of a helicopter. In some embodiments, the plurality of wireless sensors is configured to monitor one or more components of a helicopter selected from the group consisting of: one or more components of a tail gear box of the helicopter; one or more components of a tail rotor assembly of the helicopter; one or more components of an aircraft intermediate gear box of the helicopter; one or more aircraft drive shaft bearings of the helicopter; one or more components of an engine of the helicopter; one or more components of an aircraft main gear box of the helicopter; one or more components of a main rotor assembly of the helicopter; and combinations thereof. In some embodiments, the one or more components of a helicopter may include one or more components of a main rotor head of the helicopter or one or more components of a fuselage of the helicopter. In some embodiments, the plurality of wireless sensors is configured to monitor one or more components of a helicopter, and the vibration of the helicopter comprises an operating vibration frequency of the helicopter. In some embodiments, the operating vibration frequency of the helicopter comprises an operating vibration frequency of an input driveshaft. In some embodiments, at least one of the plurality of wireless sensors is configured to switch from a low power sleep mode to a data acquisition mode triggered at least in part by a first operating vibration frequency of the helicopter, and at least one of the plurality of wireless sensors is configured to switch from a low power sleep mode to a data acquisition mode triggered at least in part by a second operating vibration of the helicopter. In some embodiments, the at least one processing element comprises a plurality of processing elements, and wherein each of the plurality of processing elements communicates with and is configured to control an associated wireless sensor from the plurality of wireless sensors.

The present invention also provides similar embodiments for a method of monitoring the health and usage of one or more components of a vehicle.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

It should be noted that although the present specification and appended drawings show and describe a health and usage monitoring system used to monitor the health and/or usage of one or more components of a helicopter, various other embodiments of the present invention may be used to monitor the health and/or usage of one or more components of any vehicle, including, but not limited to, aircraft, watercraft, and any other man-made means of transportation, such as trains, automobiles, trucks, motorcycles, ATVs, etc.

As noted above, any decrease in weight or installation complexity of a helicopter health and usage monitoring system can translate into thousands of dollars in savings. Wireless health and usage monitoring systems, as generally described above, decrease overall weight by removing hardwired connections between the sensors and a controller and/or data acquisition device. However, wireless systems typically require additional power sources, such as batteries, to power the sensors and keep the sensors available for data acquisition. Typical health and usage monitoring system sensor duty cycles are low, such as 1 to 2%, when the aircraft is operational. Given that for some aircraft, monthly flight hours may be only 40-80 hours per month, the total system duty cycle is approximately 0.1%. Such a low duty cycle means that larger batteries may be required, when in reality the true power demand would dictate a smaller battery. Additionally, much of the sensors' battery power is wasted while waiting to acquire data.

One solution could be to cycle the sensors on for a defined period of time and off for a defined period of time, while the aircraft is operational. For example, the sensors could transition for a period of time, power on for a period of time to acquire data, transition for a period of time, power off for a period of time, and so on (e.g., transition for 5 milliseconds, power on for 200 milliseconds, transition for 5 milliseconds, power off for 4 seconds, etc.). Under this scenario, the energy consumed by a typical sensor might be approximately 260 Joules per day. Given monthly flight hours of 40-80 hours per month, this implementation would yield approximately 67 days of battery life. However, under this scenario only approximately 10% of the energy would be used in actually acquiring data. The present invention provides a solution that makes more efficient use of the power used to operate the sensors. As a result, battery life may be extended and smaller power sources may be used—ultimately saving both recurring and nonrecurring costs.

Figure 1:
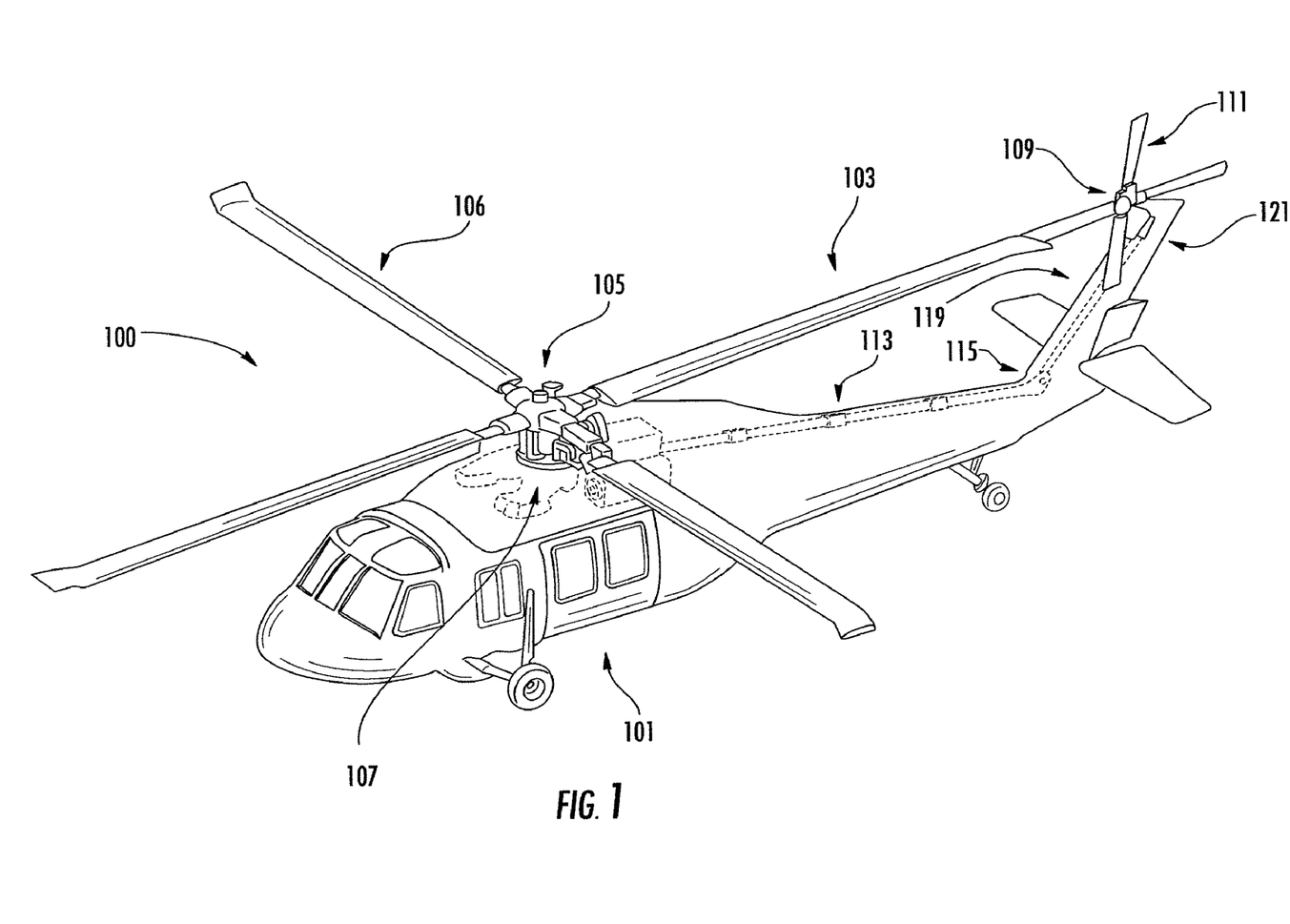
FIG. 1 shows a helicopter and the helicopter engine and drive train components as an example of a vehicle upon which the present invention may be embodied.

FIG. 1 shows a helicopter 100 as an example of a vehicle upon which the present invention may be embodied. It should be noted that although FIG. 1 and the subsequent figures show an embodiment of the present invention used to monitor the health and usage of one or more components of helicopter 100, in other embodiments the present invention may be configured to monitor one or more components of any vehicle, including other aircraft such as other rotary-wing aircraft, as well as fixed-wing aircraft.

Helicopter 100, shown in the depicted embodiment of FIG. 1, generally includes a body 101 and a propulsion system 103. The propulsion system 103 of helicopter 100 includes a single main rotor assembly 105, upon which four main rotor blades 106 are mounted, and a tail rotor assembly 109, which is included to counter torque on the body 101 caused by the main rotor assembly 105. The tail rotor assembly 109 includes four tail rotor blades 111. The main rotor assembly 105 is powered by main gear box 107. A first drive shaft 113 is connected to the main gear box 107 and extends along the length of the helicopter body 101 to an intermediate gear box 115. A series of hanger bearings 117 (shown in FIG. 4) support the first drive shaft 113 along the length of the helicopter body 101. A second drive shaft 119 extends from the intermediate gear box 115 to a tail gear box 121, which powers the tail rotor assembly 109.

As noted above, a failure of an engine and/or drive component of an aircraft, especially a rotary wing aircraft such as helicopter 100, can be catastrophic. However, any increase in weight for such an aircraft translates into large increases in recurring and non-recurring costs associated with operating the aircraft. In order to strike a balance between these competing interests, the health and usage monitoring system 130 of the present invention provides efficient weight and energy management performance characteristics by including a series of wireless sensors, represented in the depicted embodiment as wireless accelerometers, that are configured to switch between a low power sleep mode and a data acquisition mode. In the low power sleep mode, the sensors do not acquire data from the components of the aircraft, however once triggered to the data acquisition mode, the sensors may begin to acquire health and/or usage data that is then transmitted wirelessly to a data access point, where the health and/or usage data is stored. The sensors may then be triggered back to a low power sleep mode where no data is acquired.

Figure 2:
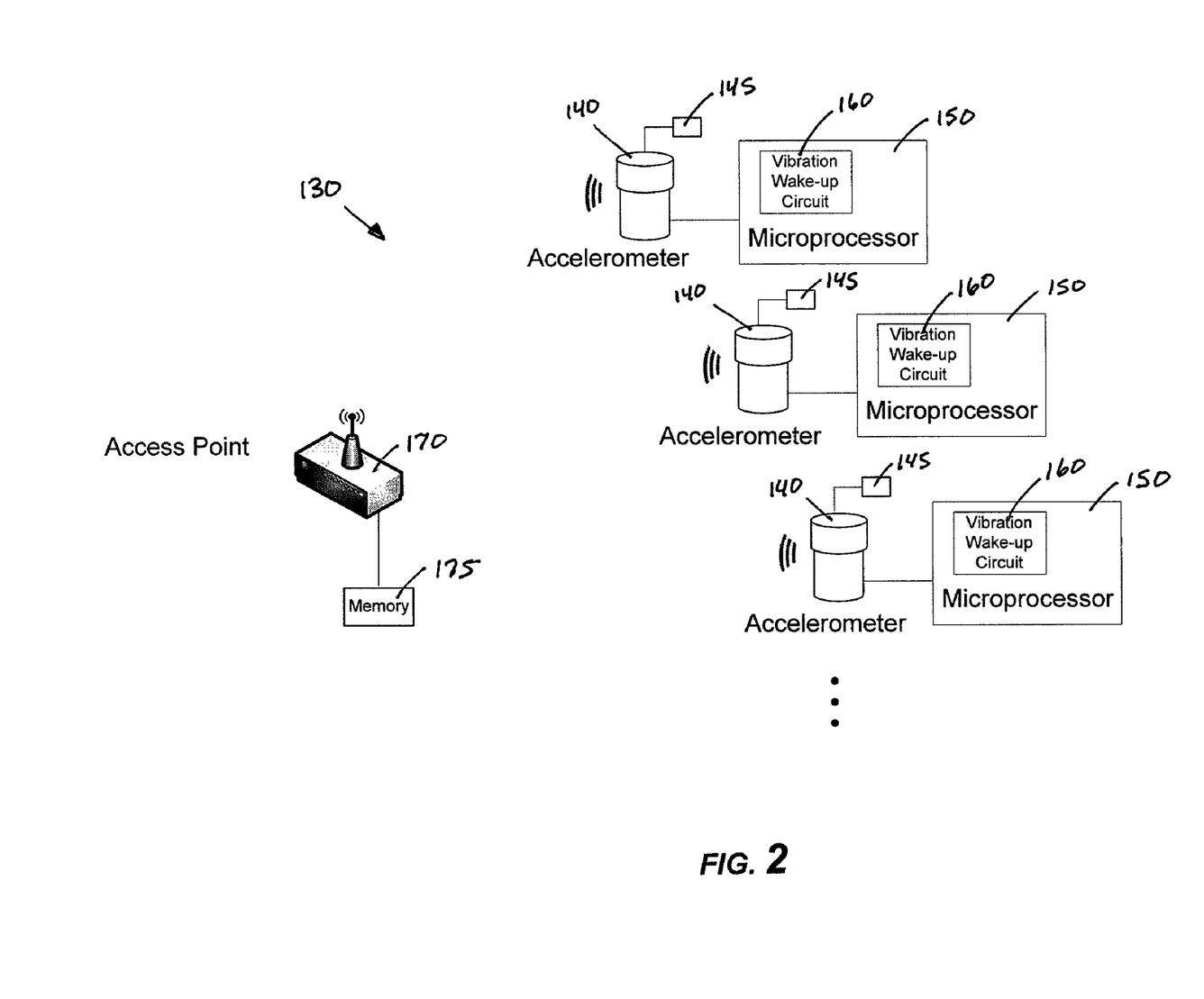
FIG. 2 shows a health and usage monitoring system according to one embodiment of the present invention.

FIG. 2 shows a health and usage monitoring system 130 according to one embodiment of the present invention. The health and usage monitoring system 130 is configured to monitor and capture monitoring data of one or more components of an aircraft using a series of sensors. In the depicted embodiment, the sensors comprise wireless accelerometers 140 that capture vibration data, and each of the wireless accelerometers is controlled by an individual processing element 150. Examples of suitable wireless accelerometers include, but need not be limited to, wireless accelerometers produced by Techkor Instrumentation® and wireless accelerometers produced by Micro Strain®. The processing element 150 may be embodied in a number of different ways. For example, the processing element 150 may be embodied as a processor, a microprocessor, a coprocessor, a controller or various other processing means or devices including integrated circuits such as, for example, an ASIC (application specific integrated circuit), or a FPGA (field-programmable gate array). The wireless accelerometers 140 are powered by power sources 145. In the depicted embodiment, the wireless accelerometers 140 are powered by dedicated batteries, however in other embodiments the sensors may be powered in other ways, including, but not limited to, a single power source (e.g. a single battery or a single energy harvesting device powering all of the sensors), dedicated energy harvesting devices, one or more power sources powering other components of the aircraft, or combinations thereof.

In the depicted embodiment, the processing elements 150 are configured as microprocessors (such as, for example, ATmega 128 microcontrollers produced by Atmel Corporation). The processing elements 150 of the depicted embodiment include at least one low power sleep mode that can be interrupted by a discrete input (such as, for example, a voltage signal) that triggers the processing elements 150 into an active mode. Once the discrete input is absent (or after predetermined period of time after the discrete input is absent), the processing elements 150 may return to the low power sleep mode. In the depicted embodiment, the processing elements 150 include vibration wake-up circuits 160 that are configured to generate discrete outputs (such as for example, by generating a small electrical charge upon sensing a vibration which may then be input to an OPAMP to amplify the signal into a discrete output) to trigger the processing elements 150 between a low power sleep mode and an active mode. In other embodiments, the vibration wake-up circuits 160 may be replaced with CMOS devices configured to switch the processing elements 150 between a low power sleep mode and an active mode. In still other embodiments, other devices capable of converting low-level vibrations changes into electrical charges (such as, for example, energy harvesting devices) may be used to generate discrete outputs to trigger the processing elements 150 between a low power sleep mode and an active mode. Examples of such energy harvesting devices include, but are not limited to, inductive energy harvesting (IEH) devices and piezoelectric energy harvesting (PEH) devices. In still other embodiments, since the processing elements 150 are already in communication with accelerometers (which are configured to convert mechanical vibrations into electrical charges) the accelerometers themselves may be used to generate the discrete outputs to trigger the processing elements between a low power sleep mode and an active mode.

In general, the vibration wake-up circuits 160 of the depicted embodiment are configured to generate discrete outputs based on vibrations of the helicopter 100. More specifically, the vibration wake-up circuits 160 of the depicted embodiment are configured to generate discrete outputs based on one or more operating vibration frequencies of the helicopter. For the purpose the current specification and appended claims and drawings, the term "operating vibration frequency" and related forms thereof refer to one or more vibration frequency signatures exhibited by an engine and/or drive component of the helicopter during operation (such as, for example, when idling and/or when flying). In various embodiments, each of the processing elements 150, via its respective vibration wake-up circuit 160, may be tuned to at least one operating vibration frequency of a single component of the aircraft (such as, for example, being configured to generate a discrete voltage signal at or near at least one operating vibration frequency of an input drive shaft), or, in other embodiments, the processing elements 150, via their respective vibration wake-up circuits 160, may be tuned to at least one operating vibration frequency of several engine and/or drive components of the aircraft.

As such, once one or more of the components of the aircraft are vibrating at an operating vibration frequency (such as, for example, when the engine and drive components of the aircraft are operating) each vibration wake-up circuit 160 may send a discrete output to trigger its respective processing element 150 from a low power sleep mode to an active mode. In the active mode, the processing element 150 may control its associated wireless accelerometer 140 such that the wireless accelerometer 140 switches from a low power sleep mode to a data acquisition mode whereby the accelerometer 140 may be controlled by the processing element 150 to sample and transmit vibration data to the data access point 170. In the active mode, the processing element 150 may control the wireless accelerometer 140 in a variety of ways including controlling the accelerometer according to a predefined routine so as to sample and transmit data for a defined period of time, to pause for a period of time, and to repeat the process. In other instances, the active mode of the processing element 150 may control the wireless accelerometer 140 to sample and transmit vibration data continuously. In still other instances, the processing element 150 may control the wireless accelerometer 140 to sample vibration data continuously and to transmit the data periodically, such as after a predefined period of time or when data sample(s) exceed or fall below a threshold value. In some embodiments, the data access point 170 may transmit the data locally and/or externally for real-time analysis. In other embodiments, such as the depicted embodiment, the data access point 170 may be in communication with a memory device 175, which may include, for example, volatile and/or non-volatile memory. In such an embodiment, the data may be available to be accessed at a later time, such as during standard maintenance and inspection procedures after each flight. It should be noted that for the purpose of the current specification and appended claims and drawings, the term "low power sleep mode" represents any power condition less than a fully active power condition. In some embodiments, such power conditions may draw some notable level of power. In other embodiments such power conditions may draw little to no power, essentially amounting to a deep sleep mode.

In some embodiments, all of the vibration wake-up circuits 160 are tuned to the same operating vibration frequency of the same component of the aircraft. Once the operating vibration frequency of the component is sensed, the processing elements 150 and thus the wireless accelerometers 140 are triggered from the sleep mode into the active mode such that all of the respective wireless accelerometers begin to acquire and transmit data to the data access point 170 approximately simultaneously. Once the operating vibration frequency is no longer present (such as, for example, when the helicopter is not flying and/or is turned off), the vibration wake-up circuits cease sending the discrete outputs such that the processing elements 150 and thus the wireless accelerometers 140 return to the low power sleep modes and wireless accelerometers 140 cease acquiring data. As a result of triggering the sensors from a low power sleep mode to a data acquisition mode when the aircraft is operating and returning the sensors to a low power sleep mode when the aircraft is not operating, the present invention provides efficient energy management for the sensors. In terms of the depicted embodiment, this means that the size and weight of the accelerometers 140 may be minimized because of the efficient use of power from the power sources 145.

In other embodiments, individual vibration circuits 160 may be tuned to operating vibration frequencies of different components of the aircraft. In these embodiments, various processing elements 150 may be triggered from a sleep mode into an active mode at different times, when the respective components of the aircraft exhibit the respective operating vibration frequencies. In such embodiments, the timing of data acquisition from the accelerometers 140 may be targeted to the components being monitored. As such, the use of power from the power sources 145 may be further optimized based on the need generated by the operating characteristics of the component(s) being monitored.

Figure 3:
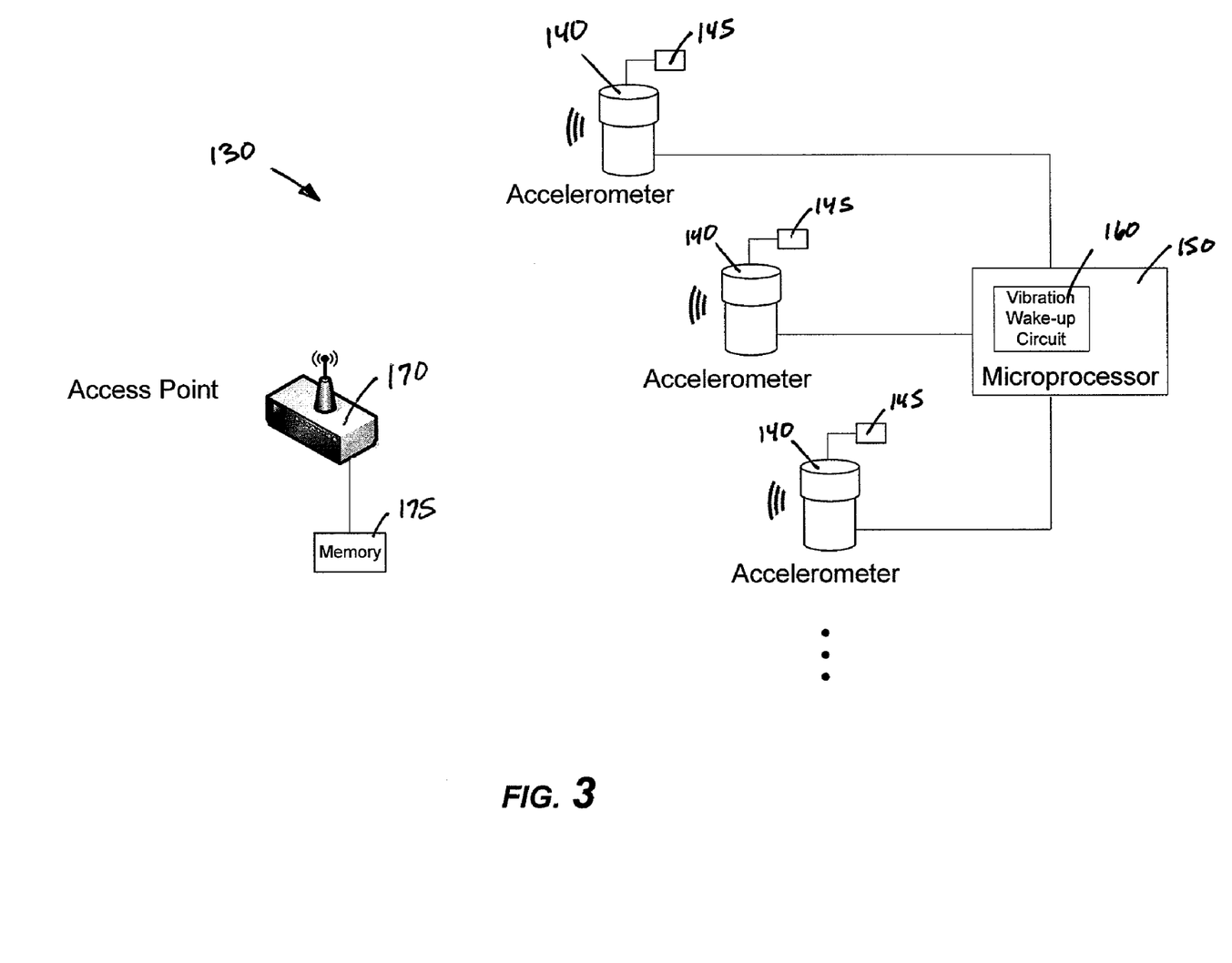
FIG. 3 shows a health and usage monitoring system according to another embodiment of the present invention.

FIG. 3 shows a health and usage monitoring system 130 according to another embodiment of the present invention. As above, the health and usage monitoring system 130 of the depicted embodiment is configured to monitor and capture vibration data of one or more components of an aircraft using a series of wireless accelerometers 140, which are powered by power sources 145. In the depicted embodiment, rather than each accelerometer 140 being controlled by an individual processing element 150, any number (and in some embodiments all) of the accelerometers 140 are controlled by a single processing element 150. In such embodiments, the processing element 150 comprises at least one vibration wake-up circuit 160 configured to generate a discrete output to trigger the processing element 150 from a low power sleep mode to an active mode based on an operating vibration frequency of the helicopter. In various embodiments, the processing element 150, via its respective vibration wake-up circuit 160, may be tuned to one or more operating vibration frequencies of a component of the aircraft such that when the aircraft exhibits the operating vibration frequency, the vibration wake-up circuit sends a discrete output to the processing element, triggering it from a low power sleep mode to an active mode whereby the wireless accelerometers 140 are switched into a data acquisition mode. In the data acquisition mode, the wireless accelerometers 140 acquire and transmit data to a data access point 160, which, in the depicted embodiment, stores the data in a memory device 175, as similarly described above.

Figure 4:
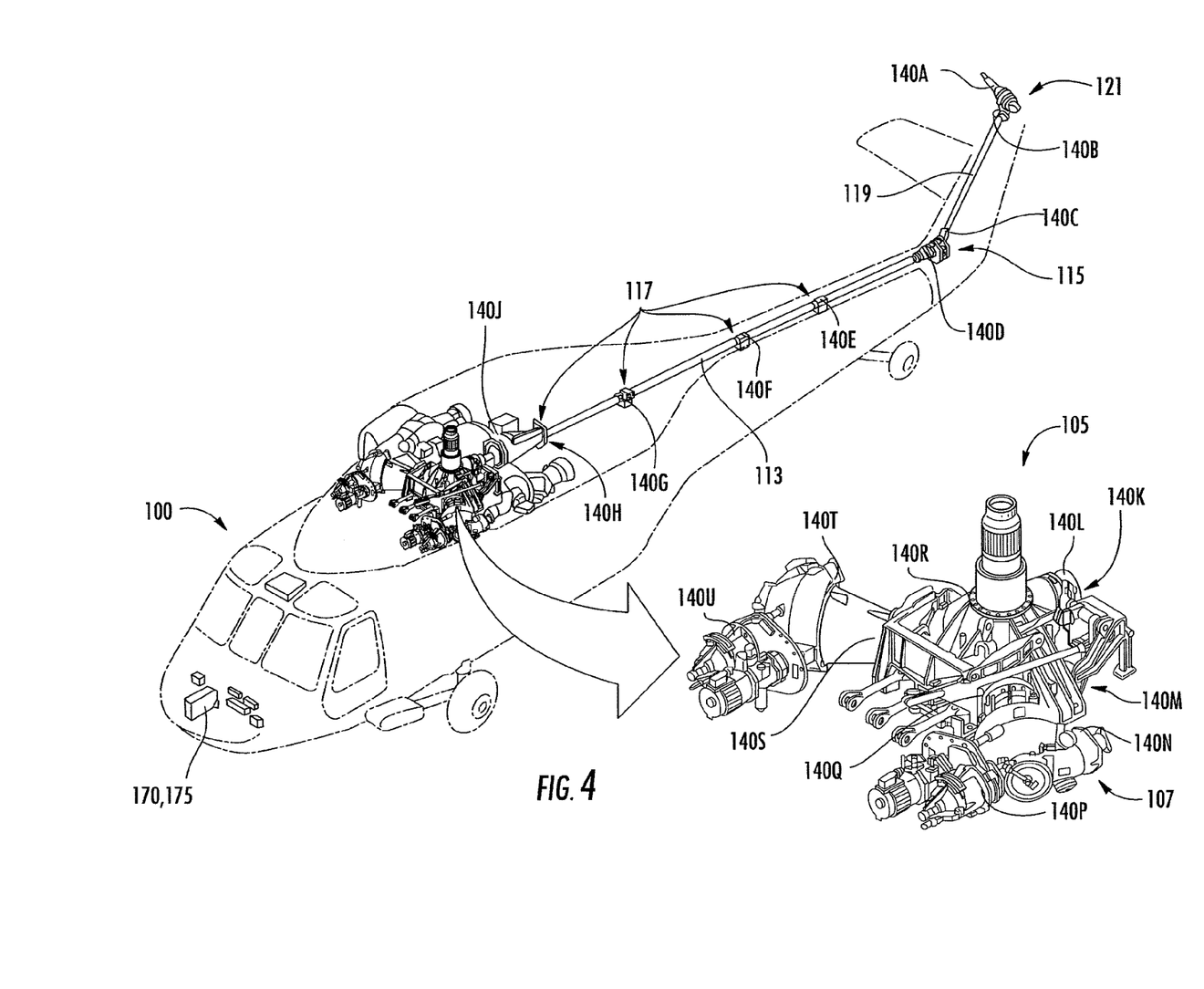
FIG. 4 shows a helicopter employing a health and usage monitoring system for monitoring the health and usage of several components of the helicopter in accordance with another embodiment of the present invention.

FIG. 4 shows the helicopter 100 of FIG. 1 employing a health and usage monitoring system (such as one of the health and usage monitoring system embodiments described with respect to FIG. 2 and FIG. 3), for monitoring the health and usage of several components of the engine and drive train of the helicopter 100 in accordance with one embodiment of the present invention. In the depicted embodiment, the several components of the engine and drive train are monitored by the health and usage monitoring system by attaching one or more wireless accelerometers 140 proximate various components to be monitored. It should be noted that in other embodiments, various other and/or additional components of the engine and/or drive train, may be monitored by a health and usage monitoring system. Such components may include, but need not be limited to, various shafts, bearings, and gears of the engine and/or drive train, which in some embodiments may comprise hundreds of individual components, that are monitored by a plurality of sensors.

Referring the embodiment depicted in FIG. 4, the health and/or usage of components of the tail rotor assembly 109 and tail gear box 121 are monitored by attaching a wireless accelerometer 140A proximate the tail gear box output and a wireless accelerometer 140B proximate the tail gear box input. The health and/or usage of components of the intermediate gear box 115 are monitored by attaching a wireless accelerometer 140C proximate the intermediate gear box output and a wireless accelerometer 140D proximate the intermediate gear box input. The health and/or usage of the first drive shaft 113 and the hanger bearings 117 are monitored by attaching wireless accelerometers 140E, 140F, 104G, and 140H proximate the four hanger bearings 117. The health and/or usage of the oil cooler fan support bearing is monitored by attaching wireless accelerometer 140J proximate the oil cooler fan shroud.

The health and/or usage of components of the main gear box 107 and the main rotor assembly 105 are monitored by attaching wireless accelerometers 140K proximate the starboard ring gear, 140L proximate the Tail Takeoff (TTO) radial gear, 140M proximate the port ring gear, 140N proximate the port accessory gear box input, 140P proximate the port accessory gear box output, 140Q proximate the port main gear, 140R proximate the main mast, 140S proximate the starboard main gear, 140T proximate the starboard accessory gear box input, and 140U proximate the starboard accessory gear box output.

It should be noted that in the depicted embodiment, the wireless accelerometers 140 may also be used to monitor and/or confirm the monitoring of one or more components of the drive train, or any other component of the aircraft for which monitoring is desired. Thus, although the depicted embodiments of the present invention may only show exemplary uses for the present invention, in other embodiments, various other and/or additional components of the engine and/or drive train may be monitored by a health and usage monitoring system according to the present invention. Such components may include, but need not be limited to, various shafts, bearings, and gears of the engine and/or drive train, which in some embodiments may comprise hundreds of individual components, that are monitored by a plurality of sensors. Other components may include, but need not be limited to, rotating components, such as the main rotor head, or the fuselage itself.

Many modifications and other embodiments of the invention set forth herein will come to mind to one skilled in the art to which this invention pertains having the benefit of the teachings presented in the foregoing descriptions and the associated drawings. Therefore, it is to be understood that the That which is claimed:

1. A health and usage monitoring system for use in monitoring health and usage of one or more components of a vehicle, the system comprising:
a data access point;
a plurality of wireless sensors configured to monitor one or more components of the vehicle and to communicate monitoring data to the data access point; and
at least one processing element in communication with and configured to control the plurality of wireless sensors,
wherein one or more of the plurality of wireless sensors is configured to switch from a low power sleep mode to a data acquisition mode triggered at least in part by a vibration of the vehicle.

2. The health and usage monitoring system of claim 1, wherein the one or more of the plurality of wireless sensors communicates monitoring data to the data access point when the one or more of the plurality of wireless sensors is in the data acquisition mode.

3. The health and usage monitoring system of claim 1, wherein the processing element includes a vibration-based wakeup circuit, and wherein the one or more of the plurality of wireless sensors is configured to switch modes via the processing element.

4. The health and usage monitoring system of claim 1, wherein the processing element includes a CMOS device, and wherein the one or more of the plurality of wireless sensors is configured to switch modes via the processing element.

5. The health and usage monitoring system of claim 1, wherein the processing element includes an energy harvesting device, and wherein the one or more of the plurality of wireless sensors is configured to switch modes via the processing element when the energy harvesting device sends an electrical charge triggered by a vibration of the vehicle.

6. The health and usage monitoring system of claim 5, wherein the energy harvesting device is selected from the group consisting of:
an inductive energy harvesting device;
a piezoelectric energy harvesting device; and
combinations thereof.

7. The health and usage monitoring system of claim 1, wherein the plurality of wireless sensors is configured to gather vibration data of one or more components of the vehicle.

8. The health and usage monitoring system of claim 7, wherein the plurality of wireless sensors comprises wireless accelerometers.

9. The health and usage monitoring system of claim 1, wherein the health and usage monitoring system is configured to monitor one or more components of a helicopter.

10. The health and usage monitoring system of claim 1, wherein the plurality of wireless sensors is configured to monitor one or more components of a helicopter, and wherein the one or more of the components is selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

11. The health and usage monitoring system of claim 1, wherein the plurality of wireless sensors is configured to monitor one or more components of a helicopter, and wherein the vibration of the helicopter comprises at least one operating vibration frequency of the helicopter.

12. The health and usage monitoring system of claim 11, wherein the operating vibration frequency of the helicopter comprises an operating vibration frequency of an input driveshaft.

13. The health and usage monitoring system of claim 11, wherein at least one of the plurality of wireless sensors is configured to switch from a low power sleep mode to a data acquisition mode triggered at least in part by a first operating vibration frequency of the helicopter, and wherein at least one of the plurality of wireless sensors is configured to switch from a low power sleep mode to a data acquisition mode triggered at least in part by a second operating vibration frequency of the helicopter.

14. The health and usage monitoring system of claim 1, wherein the at least one processing element comprises a plurality of processing elements, and wherein each of the plurality of processing elements communicates with and is configured to control an associated wireless sensor from the plurality of wireless sensors.

15. The health and usage monitoring system of claim 1, wherein the plurality of wireless sensors is configured to monitor one or more components of a helicopter, and wherein the one or more components includes one or more components of a main rotor head of the helicopter or one or more components of a fuselage of the helicopter.

16. A method of monitoring the health and usage of one or more components of a vehicle, the method comprising:
operating the vehicle; and
monitoring one or more components of the vehicle with a plurality of wireless sensors,
wherein one or more of the plurality of wireless sensors is configured to switch from a low power sleep mode to a data acquisition mode triggered at least in part by a vibration of the vehicle.

17. The method according to claim 16, wherein when in the data acquisition mode, the one or more of the plurality of wireless sensors monitors the one or more components of the vehicle and communicates monitoring data to a data access point.

18. The method according to claim 16, further comprising:
controlling the plurality of wireless sensors with at least one processing element, wherein the processing element includes a vibration-based wakeup circuit; and
switching the one or more of the plurality of wireless sensors from the low power sleep mode to the data acquisition mode via the processing element.

19. The method according to claim 18, wherein the processing element includes a CMOS device, and further comprising switching the one or more of the plurality of wireless sensors from the low power sleep mode to the data acquisition mode via the processing element.

20. The method according to claim 18, wherein the processing element includes an energy harvesting device, and further comprising sending an electrical charge to the processing element with the energy harvesting device, and switching the one or more of the plurality of wireless sensors from the low power sleep mode to the data acquisition mode when the energy harvesting device sends an electrical charge to the processing element triggered by the vibration of the vehicle.

21. The method according to claim 20, wherein the energy harvesting device is selected from the group consisting of:
an inductive energy harvesting device;
a piezoelectric energy harvesting device; and
combinations thereof.

22. The method according to claim 16, wherein the plurality of wireless sensors is configured to gather vibration data of one or more components of the vehicle.

23. The method according to claim 22, wherein the plurality of wireless sensors comprise wireless accelerometers.

24. The method according to claim 16, wherein one or more components of a helicopter are monitored.

25. The method according to claim 16, wherein operating a vehicle and monitoring one or more components of the vehicle with a plurality of wireless sensors comprises operating a helicopter and monitoring one or more components of the helicopter with a plurality of wireless sensors, and wherein the one or more of the components of the helicopter is selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

26. The method according to claim 16, wherein the steps of operating a vehicle and monitoring one or more components of the vehicle with a plurality of wireless sensors comprises operating a helicopter and monitoring one or more components of the helicopter with a plurality of wireless sensors, and wherein the vibration of the helicopter comprises an operating vibration frequency of the helicopter.

27. The method according to claim 26, wherein the operating vibration frequency of the helicopter comprises an operating vibration frequency of an input driveshaft.

28. The method according to claim 26, wherein at least one of the plurality of wireless sensors is configured to switch from a low power sleep mode to a data acquisition mode triggered at least in part by a first operating vibration frequency of the helicopter, and wherein at least one of the plurality of wireless sensors is configured to switch from a low power sleep mode to a data acquisition mode triggered at least in part by a second operating vibration frequency of the helicopter.

29. The method according to claim 16, further comprising:
providing a plurality of processing elements, wherein each of the plurality of processing elements communicates with and is configured to control an associated wireless sensor from the plurality of wireless sensors.

30. The method according to claim 16, wherein operating a vehicle and monitoring one or more components of the vehicle with a plurality of wireless sensors comprises operating a helicopter and monitoring one or more components of the helicopter with a plurality of wireless sensors, and wherein the one or more of the components of the helicopter includes one or more components of a main rotor head of the helicopter or one or more components of a fuselage of the helicopter.

* * * * *